United States Patent
Choi et al.

(10) Patent No.: US 8,927,150 B2
(45) Date of Patent: Jan. 6, 2015

(54) BINDER AND POSITIVE ACTIVE MATERIAL COMPOSITION FOR RECHARGEABLE LITHIUM BATTERY, AND RECHARGEABLE LITHIUM BATTERY INCLUDING SAME

(75) Inventors: Nam-Soon Choi, Yongin-si (KR);
Man-Seok Han, Yongin-si (KR);
Tae-Keun Kim, Yongin-si (KR);
Jin-Kyu Hong, Yongin-si (KR);
Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 491 days.

(21) Appl. No.: 12/877,927

(22) Filed: Sep. 8, 2010

(65) Prior Publication Data

US 2011/0143198 A1 Jun. 16, 2011

(30) Foreign Application Priority Data

Dec. 11, 2009 (KR) .................... 10-2009-0123317

(51) Int. Cl.
*H01M 4/62* (2006.01)
*H01M 10/052* (2010.01)
*C08L 27/16* (2006.01)
*H01M 4/131* (2010.01)
*H01M 4/505* (2010.01)
*C08L 1/28* (2006.01)

(52) U.S. Cl.
CPC ............ *H01M 10/052* (2013.01); *C08L 27/16* (2013.01); *H01M 4/131* (2013.01); *H01M 4/505* (2013.01); *H01M 4/621* (2013.01); *H01M 4/622* (2013.01); *H01M 4/623* (2013.01); *C08L 1/28* (2013.01); *C08L 1/284* (2013.01); *C08L 1/286* (2013.01); *Y02E 60/122* (2013.01)
USPC .......................................................... 429/217

(58) Field of Classification Search
None
See application file for complete search history.

(56) References Cited

U.S. PATENT DOCUMENTS

| 7,052,629 | B2 | 5/2006 | Maeda et al. | |
|---|---|---|---|---|
| 7,179,563 | B2 | 2/2007 | Kim et al. | |
| 7,776,474 | B2 | 8/2010 | Taniguchi et al. | |
| 2005/0271940 | A1* | 12/2005 | Fukunaga et al. | 429/217 |
| 2006/0115730 | A1* | 6/2006 | Taniguchi et al. | 429/217 |
| 2008/0241670 | A1* | 10/2008 | Kim et al. | 429/163 |

FOREIGN PATENT DOCUMENTS

| JP | 2005-011822 | 1/2005 |
|---|---|---|
| JP | 2005-123047 | 5/2005 |
| KR | 10-2001-0010226 | 2/2001 |
| KR | 10-0446660 | 5/2003 |
| KR | 10-2004-0100259 | 12/2004 |
| KR | 10-0467455 B1 | 1/2005 |
| KR | 10-2006-0060609 | 6/2006 |
| WO | WO 2009/112920 * | 9/2009 |

* cited by examiner

*Primary Examiner* — Jonathan Crepeau
(74) *Attorney, Agent, or Firm* — Christie, Parker & Hale, LLP

(57) ABSTRACT

A rechargeable lithium battery includes a binder for a rechargeable lithium battery, and a positive active material composition. The binder for the rechargeable lithium battery includes a nitrile-based polymer nanoparticle and a fluorine-containing polymer nanoparticle.

14 Claims, 6 Drawing Sheets

BINDER AND POSITIVE ACTIVE MATERIAL COMPOSITION FOR RECHARGEABLE LITHIUM BATTERY, AND RECHARGEABLE LITHIUM BATTERY INCLUDING SAME

CROSS-REFERENCE TO RELATED APPLICATIONS

This application claims priority to and the benefit of Korean Patent Application No. 10-2009-0123317, filed in the Korean Intellectual Property Office on Dec. 11, 2009, the contents of which are incorporated herein by reference.

BACKGROUND

1. Field of the Invention

Aspects of this disclosure relate to a binder and a positive active material composition for a rechargeable lithium battery, and a rechargeable lithium battery including the same.

2. Description of the Related Art

In recent times, due to reductions in size and weight of portable electronic equipment, there has been a need to develop batteries suitable for use in the portable electronic equipment, where the batteries have both high performance and large capacity. Currently commercialized lithium batteries have an average discharge potential of 3.7V, and thus are 4V-grade batteries. Such batteries are components applicable to portable telephones, laptop computers, camcorders, and the like, that are called 3 C in a digital generation.

The rechargeable lithium battery includes a positive electrode, a negative electrode, and an electrolyte. The positive electrode includes a lithiated compound, such as $LiCoO_2$, $LiMn_2O_4$, $LiNi_{1-x}Co_xO_2$ (0<x<1), and the like, as a positive active material. However, rechargeable lithium batteries are problematic in that transition elements of the positive active materials are eluted into the electrolyte solutions when the batteries are charged or discharged at high temperatures, or allowed to stand at high temperatures, resulting in deterioration of the cycle-life characteristics thereof.

SUMMARY OF THE INVENTION

Aspects of the invention provide a binder for a rechargeable lithium battery improving a high temperature thermal stability and improving charge and discharge characteristics of a rechargeable lithium battery.

Aspects of the invention provide a positive active material composition for a rechargeable lithium battery including the binder.

Aspects of the invention provide a rechargeable lithium battery including the binder.

According to aspects, a binder for a rechargeable lithium battery may include a nitrile-based polymer nanoparticle and a fluorine-containing polymer nanoparticle.

According to aspects, the nitrile-based polymer nanoparticle may have an average particle size of about 100 to about 200 nm. According to aspects, the fluorine-containing polymer nanoparticle may have an average particle size of about 5 to about 300 nm, or may have an average particle size of 100 to 200 nm. According to aspects, the average particle size of the fluorine-containing polymer nanoparticle may be one or two times than that of the nitrile-based polymer nanoparticle.

According to aspects, a positive active material composition for a rechargeable lithium battery may include the binder, a positive active material, a conductive material, and a solvent.

According to aspects, a rechargeable lithium battery may include a positive electrode including a positive active material, a conductive material and the binder, a negative electrode including a negative active material, and a non-aqueous electrolyte is provided.

According to aspects, the solvent may include water.

According to aspects, the positive active material may be selected from the group consisting of $Li_aMn_{1-b}X_bD_2$ (0.90≤a≤1.8, 0≤b≤0.5); $Li_aMn_{1-b}X_bO_{2-c}D_c$ (0.90≤a≤1.8, 0≤b≤0.5, 0≤c≤0.05); $LiMn_{2-b}X_bO_4$ (0≤b≤0.5); $LiMn_{2-b}X_bO_{4-c}D_c$ (0≤b≤0.5, 0≤c≤0.05); $Li_aMn_{1-b-c}E_bX_cD\alpha$ (0.90≤a≤1.8, 0≤b≤0.5, 0≤c≤0.05, 0<α≤2); $Li_aMn_{1-b-c}E_bX_cO_{2-\alpha}T_\alpha$ (0.90≤a≤1.8, 0≤b≤0.5, 0≤c≤0.05, 0<α<2); $Li_aMn_bE_cG_dO_2$ (0.90≤a≤1.8, 0≤b≤0.9, 0≤c≤0.5, 0.001≤d≤0.1); $Li_aMn_bCo_cNi_dG_eO_2$ (0.90≤a≤1.8, 0≤b≤0.9, 0≤c≤0.5, 0≤d≤0.5, 0.001≤e≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $MnO_2$; $MnS_2$; $LiMnS_2$; and $Li_{(3-f)}Mn_2(PO_4)_3$, in which 0≤f≤2; X is Al, Ni, Co, Mn, Cr, Fe, Mg, Sr, V, a rare earth element, or a combination thereof; D is O, F, S, P, or a combination thereof; E is Co, Ni, or a combination thereof; T is F, S, P, or a combination thereof; And G is Al, Cr, Mn, Fe, Mg, La, Ce, Sr, V, or a combination thereof.

According to aspects, the binder for a rechargeable lithium battery may provide a rechargeable lithium battery having an improved high temperature thermal stability and improved charge and discharge characteristics.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
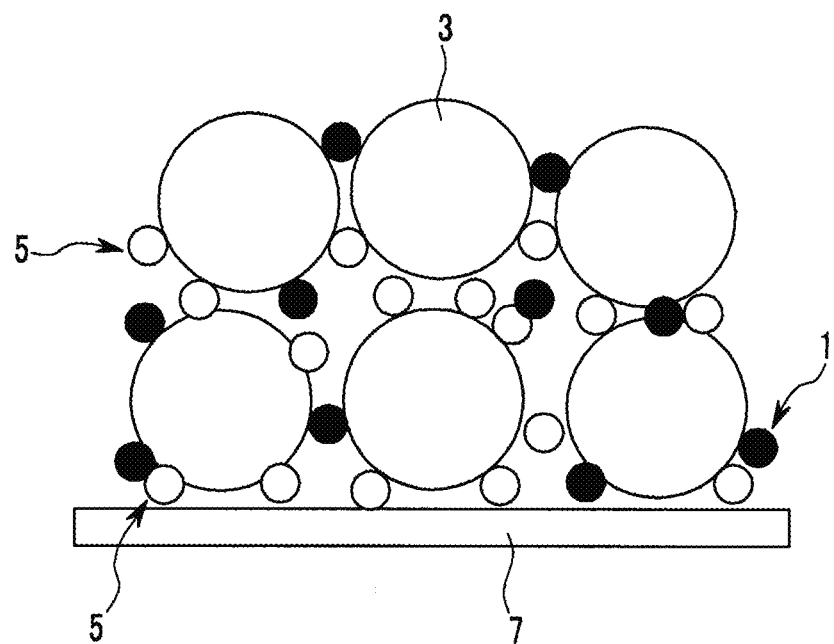
FIG. 1 is a schematic view showing a structure of an active material layer fabricated by coating a binder and an active material on a current collector according to one embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A binder for a rechargeable lithium battery according to one embodiment includes a nitrile-based polymer nanoparticle and a fluorine-containing polymer nanoparticle.

The nitrile-based polymer nanoparticle may trap metal ions dissolved in an electrolyte solution, particularly, manganese ions derived from a manganese-based active material, and the fluorine-containing polymer nanoparticles make active material particles adhere to each other. Such effects of the nitrile-based polymer nanoparticle and fluorine-containing polymer nanoparticle may be maximized when they have a nano-particle structure, while such effects are insignificant when they have a linear structure.

FIG. 1 shows a schematic view of an active material layer fabricated by coating a binder and an active material 3 on a current collector 7 according to one embodiment. The binder includes a nitrile-based polymer nanoparticle 1 and fluorine-containing polymer nanoparticles 5. As shown in FIG. 1, the fluorine-containing polymer nanoparticles 5 provide cohesion between the active material particles 3 and attach easily on the current collector 7. The nitrile-based polymer nanoparticles 1 trap manganese ions.

The nitrile-based polymer nanoparticles 1 may have an average particle size ranging from about 100 nm to about 200 nm in diameter. The fluorine-containing polymer nanoparticles 5 may have an average particle size ranging from about 5 nm to about 300 nm in diameter, for example, an average particle size ranging from about 100 nm to about 200 nm in diameter.

In one embodiment, while the average particle sizes of the fluorine-containing polymer nanoparticles 5 and the nitrile-based polymer nanoparticles 1 fall in the range, the average particle size of the fluorine-containing polymer nanoparticles 5 may be one or two times larger than that of the nitrile-based polymer nanoparticles 1.

When the nitrile-based polymer nanoparticles 1 have an average size within the range from about 100 nm to about 200 nm in diameter, trapping of manganese ions may be maximized. In addition, when the fluorine-containing polymer nanoparticles 5 have an average size within the range from about 100 nm to about 200 nm in diameter, dot-adhesion between active material particles 3 having an average particle size of micrometers may be maximized, and therefore adhesion to a current collector may be improved.

As for the nitrile-based polymer nanoparticles, any material including a —CN group may be used. Non-limiting examples of the nitrile-based polymer include poly(acrylonitrile-co-methylmethacrylate), poly(acrylonitrile-co-methacrylic acid), poly(acrylonitrile-co-methylacrylonitrile), poly(acrylonitrile-co-lithium methacrylate) (MALi represended by the following Chemical Formula 1), or a combination thereof. As described above, a polymer including both of a —CN group and a carboxyl group may trap easily metal ions derived from a positive active material.

[Chemical Formula 1]

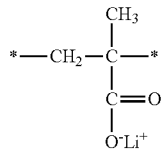

The fluorine-containing polymer nanoparticles may be a polyvinylidene fluoride, polyvinylidene fluoride-hexafluoropropylene copolymer (PVdF-HFP), a polyvinylidenefluoride-tetrafluoroethylene copolymer (PVdF-TFE), or a combination thereof. The fluorine-containing polymer may be melted during a pressurization process for preparing an electrode, for example, the pressurization process may be performed at a temperature higher than a melting point of the polymer so that adhesion between the active material particles may be improved.

In one embodiment, the nitrile-based polymer nanoparticles and the fluorine-containing polymer nanoparticles are mixed at a weight ratio of about 10:90 to about 95:5.

When the mixing ratio of the nitrile-based polymer nanoparticles and the fluorine-containing polymer nanoparticles is within the above range, the fluorine-containing polymer nanoparticles endowing cohesion between the active materials may be introduced in an appropriate amount, and therefore, an electrical networking in an electrode may be suitably maintained.

The nanoparticles of the polymers, for example, may be prepared by emulsion polymerization, but any method of preparing nanoparticles may be used if the resultant nanoparticles have an average size within the ranges according aspects of the invention. As for one example of an emulsion polymerization, monomers for the nitrile-based polymer or the fluorine-containing polymer, an emulsifier, and a solvent are mixed, a temperature of the mixture is adjusted to be at about 50° C. to about 60° C., and an initiator is added to perform a polymerization.

The amount of the monomer may be about 10 wt % to about 15 wt % based on the weight of the solvent. The amounts of the emulsifier and the initiator may be controlled.

The emulsifier may include an ionic surfactant, such as polyvinylalcohol, polyacrylic acid, sodium dodecylsulfate, and the like. The solvent may include water. The initiator may include a mixture of potassium persulfate and sodium bisulfate. When the mixture of potassium persulfate and sodium bisulfate is used as an initiator, the mixing ratio may be suitably controlled.

The mixing process may be performed under a mixing speed of about 300 rpm to about 500 rpm.

The polymerization process may be performed for about 4 hours to about 7 hours at about 50° C. to about 60° C.

The binder according to one embodiment may further include a cellulose-based thickener. Herein, the amount of the cellulose-based thickener may be about 10 parts by weight to about 30 parts by weight based on 100 parts by weight of the binder, for example, may be about 10 parts by weight to about 20 parts by weight based on 100 parts by weight of the binder. The cellulose-based thickener may be a material that maintains the viscosity of an active material composition and increases stability of the composition. When the cellulose-based thickener is used in an amount of the above range, the effect of the thickener may be obtained while maintaining the effect of the binder.

The cellulose-based thickener may include carboxylmethyl cellulose, methyl cellulose, ethyl cellulose, hydroxy propyl methyl cellulose, hydroxy propyl ethyl cellulose, or a combination thereof.

According to another embodiment, a positive active material composition for a rechargeable lithium battery including the binder, a positive active material, a conductive material, and a solvent is provided.

As described above, since the binder includes nitrile-based polymer nanoparticles, water may be used as a solvent. Since water may be used as a solvent instead of an organic solvent, the positive active material may not cause the problems, such as safety problems caused by lithium explosion, environmental pollution, high manufacturing expenses, and the like. The solvent may include water singularly, or a combination of water and an organic solvent. In order to maintain the nitrile-based polymer nanoparticles and the fluorine polymer nanoparticles as nanoparticles, the organic solvent that does not dissolve them may be also used. The organic solvent may include alcohol, for example, methanol, ethanol, propanol, isopropyl alcohol, or a combination thereof. The water and organic solvent may be mixed in a mixing ratio of about 50:about 50 volume % to about 99.99:about 0.01 volume %. The binder may be dispersed as a nanoparticle in the solvent.

As for the positive active material, any lithiated compound that is used as a positive active material for a rechargeable lithium battery may be used. Non-limiting examples of the positive active material include a manganese-based active material. Examples of the manganese-based active material include $Li_aMn_{1-b}X_bD_2$ (0.90≤a≤1.8, 0≤b≤0.5); $Li_aMn_{1-b}X_bO_{2-c}D_c$ (0.90≤a≤1.8, 0≤b≤0.5, 0≤c≤0.05); $LiMn_{2-b}X_bO_4$ (0≤b≤0.5); $LiMn_{2-b}X_bO_{4-c}D_c$ (0≤b≤0.5, 0≤c≤0.05); $Li_aMn_{1-b-c}E_bX_cD_\alpha$ (0.90≤a≤1.8, 0≤b≤0.5, 0≤c≤0.05, 0<α≤2); $Li_aMn_{1-b-c}E_bX_cO_{2-\alpha}T_\alpha$ (0.90≤a≤1.8, 0≤b≤0.5, 0≤c≤0.05, 0<α<2); $Li_aMn_bE_cG_dO_2$ (0.90≤a≤1.8, 0≤b≤0.9, 0≤c≤0.5, 0.001≤d≤0.1); $Li_aMn_bCo_cNi_dG_eO_2$ (0.90≤a≤1.8, 0≤b≤0.9, 0≤c≤0.5, 0≤d≤0.5, 0.001≤e≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $MnO_2$; $MnS_2$; $LiMnS_2$; $Li_{(3-f)}Mn_2(PO_4)_3$ (0≤f≤2), in which X is Al, Ni, Co, Mn, Cr, Fe, Mg, Sr, V, a rare earth element, or a combination thereof; D is O, F, S, P, or a combination thereof; E is Co, Ni, or a combination thereof; T is F, S, P, or a combination thereof; and G is Al, Cr, Mn, Fe, Mg, La, Ce, Sr, V, or a combination thereof), or a combination thereof.

The positive active material may have a coating layer on a surface thereof, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxylcarbonate of a coating element. The compound for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any coating method such as spray coating, dipping, and the like.

When a manganese-based compound is used as a positive active material, quadrivalent manganese ions existing in a charged positive active material are reduced to trivalent manganese ions since anions included in electrolyte solution are oxidized and decomposed by the manganese-based compound. The trivalent manganese ions may be converted to divalent manganese ions by disproportion reaction. The divalent manganese ions are easily dissolved in an electrolyte solution.

Figure 2:
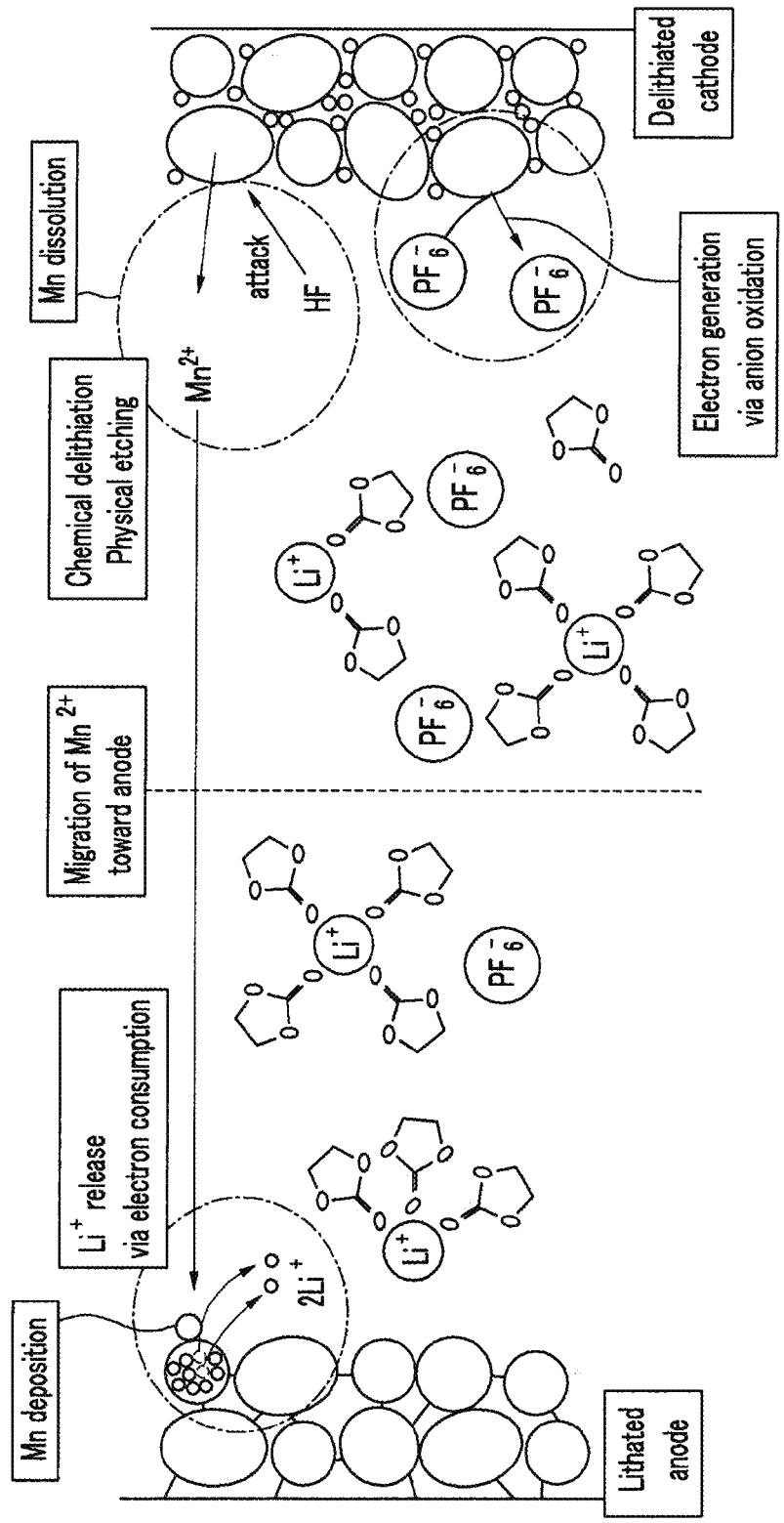
FIG. 2 shows a mechanism of a manganese-base positive active material generated through HF attack.

As shown in FIG. 2, manganese ions may be additionally eluted into an electrolyte solution by HF generated by the reaction between $H_2O$, included in an electrolyte solution as an impurity, and $LiPF_6$.

Particularly, such a reaction may easily occur, when charge and discharge is performed at high temperatures. When manganese ions are eluted into an electrolyte solution, a crystalline structure of the manganese-based compound is collapsed and sites that react with lithium ions contributing reversible capacity are decreased, thereby remarkably deteriorating the cycle-life characteristics. Due to the reaction, manganese (Mn) of a $LiMn_2O_4$ active material is eluted to an electrolyte solution to cause collapse of the active material structure, and therefore the cycle-life characteristics of a battery is deteriorated.

Figure 3:
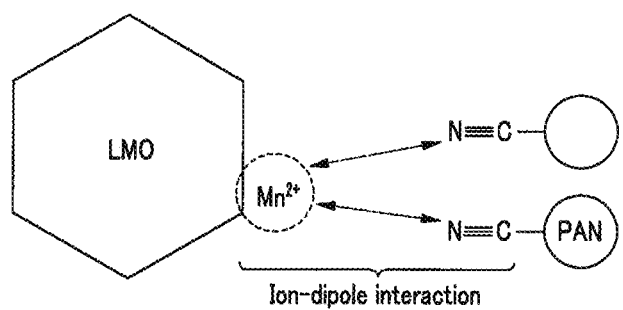
FIG. 3 shows a mutual relationship between a nitrile-based polymer nanoparticle and a positive active material according to one embodiment.

Accordingly, as shown in FIG. 3, the nitrile-based polymer nanoparticle (PAN in FIG. 3) of the binder may suppress elution of the manganese ions into an electrolyte solution even though it is attacked by a strong acid because the CN group included in the nitrile-based polymer nanoparticle may have ion-dipole interactions with manganese ions included in a positive active material (LMO in FIG. 3).

Figure 4:
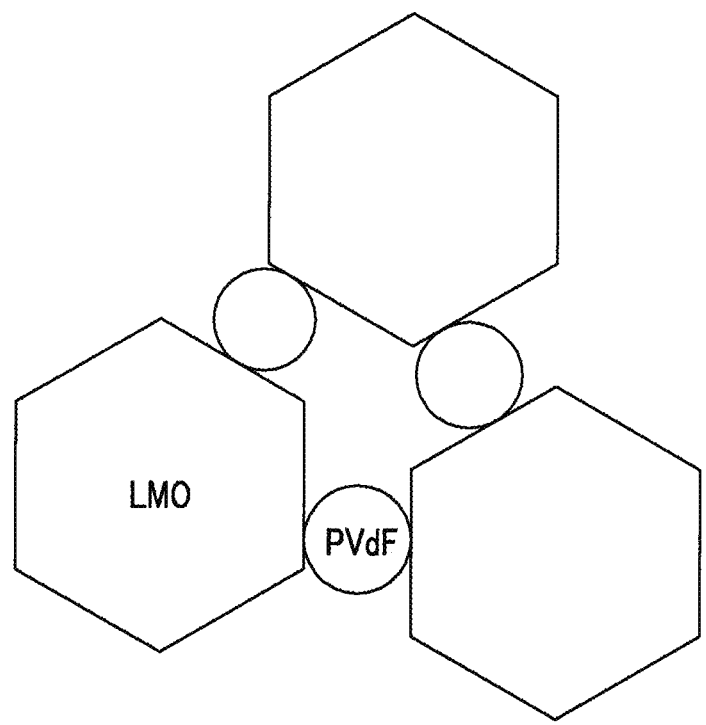
FIG. 4 shows a mutual relationship between a polyvinylidene fluoride nanoparticle and a positive active material.

As shown in FIG. 4, polyvinylidene fluoride (PVdF) of the polyvinylidene fluoride nanoparticle is melted to make a dot-adhesion between the active material (LMO) particles. Accordingly, it may prevent cracking of a positive active material layer. However, even though the positive active material layer is thickly formed on a current collector, cracking can be effectively prevented.

The conductive material is included to improve electrode conductivity. Any electrically conductive material may be used as a conductive material unless it causes a chemical change. Examples of the conductive material include one or more of a carbon-based material, such as natural graphite, artificial graphite, carbon black, acetylene black, ketjen black, carbon fiber, a metal powder; or a metal-based material, such as a metal fiber including copper, nickel, aluminum, silver, and the like; or a conductive material or a mixture thereof, such as a polyphenylene derivative, may be used.

A rechargeable lithium battery according to another embodiment includes a positive electrode including positive active material, a negative electrode including a negative active material, and non-aqueous electrolyte.

The positive electrode is prepared by applying the positive active material composition on a current collector, and the solvent included in the positive active material composition is removed due to volatilization during a drying process. The positive electrode includes a binder, a positive active material, and a conductive material. The current collector may include Al, but is not limited thereto.

The negative electrode includes a current collector and a negative active material layer disposed on the current collector, and the negative active material layer includes a negative active material.

The negative active material may include a material capable of reversibly intercalating and deintercalating lithium ions, a lithium metal, a lithium metal alloy, a material capable of doping and dedoping lithium, a transition metal oxide, or a combination thereof.

The material that reversibly intercalates/deintercalates lithium ions includes carbon materials. The carbon materials may be any generally-used carbon-based negative active material for a lithium ion rechargeable battery. Examples of the carbon material include crystalline carbon, amorphous carbon, and a mixture thereof. The crystalline carbon may be shapeless, sheet, flake, spherical, fiber shaped natural graphite, artificial graphite, or a mixture thereof. The amorphous carbon may be a soft carbon (carbon obtained by sintering at a low temperature), a hard carbon (carbon obtained by sintering at a high temperature), mesophase pitch carbide, fired coke, and the like, or a combination thereof.

Examples of the lithium metal alloy includes an alloy of lithium and a metal selected from Na, K, Rb, Cs, Fr, Be, Mg, Ca, Sr, Si, Sb, Pb, In, Zn, Ba, Ra, Ge, Al, or Sn.

Examples of the material being capable of doping/dedoping lithium include Si, $SiO_x$ (0<x<2), a Si-Q alloy (where Q is an element selected from the group consisting of an alkali metal, an alkaline-earth metal, a group 13 element, a group 14 element, a transition element, a rare earth element, and a combination thereof, and is not Si), Sn, $SnO_2$, a Sn—R alloy (R is an element selected from the group consisting of an alkali metal, an alkaline-earth metal, a group 13 element, a group 14 element, a transition element, a rare earth element, and a combination thereof, and is not Sn), and mixtures thereof. At least one of these materials may be mixed with $SiO_2$. The elements Q and R may be the same or different and independently Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like.

The negative active material layer includes a binder, and, optionally, a conductive material.

The binder improves binding properties of the negative active material particles to each other and to a current collector, and includes polyvinylalcohol, carboxylmethylcellulose, hydroxypropylcellulose, polyvinylchloride, carboxylated polyvinylchloride, polyvinylfluoride, polyethyleneoxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, but is not limited thereto.

The conductive material is included to improve electrode conductivity. Any electrically conductive material may be used as a conductive material unless it causes a chemical change. Examples of the conductive material include carbon-based materials, such as natural graphite, artificial graphite, carbon black, acetylene black, ketjen black, carbon fiber, and the like; metal-based materials including a metal powder; or a metal fiber of copper, nickel, aluminum, silver, and the like; conductive polymers of polyphenylene derivative, or mixtures thereof.

The current collector may be selected from a copper foil, a nickel foil, a stainless steel foil, a titanium foil, a nickel foam, a copper foam, a polymer substrate coated with a conductive metal, and a combination thereof.

The negative electrode may be fabricated according to the same method as the positive electrode including mixing a negative active material, a conductive material, and a binder in a solvent to prepare an active material composition, and coating the composition on the current collector. The solvent may include N-methylpyrrolidone, and the like, but is not limited thereto.

The non-aqueous organic solvent and a lithium salt may include any one that is generally used in a liquid electrolyte solution. The non-aqueous organic solvent transfers ions that are related to an electrochemical reaction of a battery.

The non-aqueous organic solvent may include carbonate-based, ester-based, ether-based, ketone-based, alcohol-based, or nonprotonic solvent. Examples of the carbonate-based solvent include dimethyl carbonate (DMC), diethyl carbonate (DEC), dipropyl carbonate (DPC), methylpropyl carbonate(MPC), ethylpropyl carbonate (EPC), methylethyl carbonate (MEC), ethylene carbonate (EC), propylene carbonate (PC), butylene carbonate (BC); and examples of the ester-based solvent include methyl acetate, ethyl acetate, n-propyl acetate, dimethylacetate, methylpropinonate, ethylpropinonate, γ-butyrolactone, decanolide, valerolactone, mevalonolactone, caprolactone, and the like. Examples of the ether-based solvent may include dibutyl ether, tetraglyme, diglyme, dimethoxyethane, 2-methyltetrahydrofuran, tetrahydrofuran, and the like; and examples of the ketone-based solvent may include cyclohexanone, and the like. Examples of the alcohol-based solvent may include ethanol, isopropyl alcohol, and the like; and examples of the nonprotonic solvent may include R—CN (wherein R is a C2 to C20 linear, branched, or cyclic hydrocarbon, a double bond, an aromatic ring, or an ether bond); amides, such as dimethylformamide; dioxolanes, such as 1,3-dioxolane, sulfolanes, and the like.

The non-aqueous organic solvent may be used singularly or as a mixture. When the organic solvent is used as a mixture, the mixture ratio may be controlled in accordance with desirable battery performance.

The carbonate-based solvent may include a mixture of a cyclic carbonate and a linear carbonate. The cyclic carbonate and the chain carbonate are mixed together in a volume ratio of about 1:1 to about 1:9, and when the mixture is used as an electrolyte, the electrolyte performance may be enhanced.

In addition, the electrolyte may further include mixtures of carbonate-based solvents and aromatic hydrocarbon-based solvents. The carbonate-based solvents and the aromatic hydrocarbon-based solvents are mixed together in a volume ratio of about 1:1 to about 30:1. Further, the electrolyte may be a gel polymer electrolyte.

The aromatic hydrocarbon-based organic solvent may be represented by the following Chemical Formula 2.

[Chemical Formula 2]

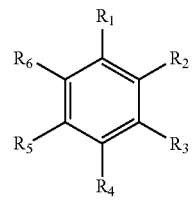

In the above Chemical Formula 2, $R_1$ to $R_6$ are the same or different, and are hydrogen, a halogen, a C1 to C10 alkyl, a C1 to C10 haloalkyl, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may be a gel polymer electrolyte. The electrolyte may further include vinylene carbonate or an ethylene carbonate-based compound of the following Chemical Formula 3 in order to improve the cycle-life characteristics of a battery.

[Chemical Formula 3]

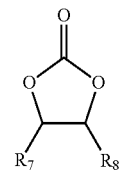

In the above Chemical Formula 3, $R_7$ and $R_8$ are the same or different, and are hydrogen, a halogen, a cyano (CN), a nitro ($NO_2$), or a C1 to C5 fluoroalkyl, provided that at least one of $R_7$ and $R_8$ is a halogen, a nitro ($NO_2$), or a C1 to C5 fluoroalkyl, and $R_7$ and $R_8$ are not simultaneously hydrogen.

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive may be adjusted within an appropriate range to improve the cycle-life properties.

The lithium salt supplies lithium ions in the battery, provides for basic operation of the rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI or $LiB(C_2O_4)_2$ (lithium bisoxalate borate, LiBOB).

The lithium salt may be used at about 0.1 to about 2.0M concentration. When the lithium salt is included at the above concentration range, electrolyte performance and lithium ion mobility may be enhanced due to optimal electrolyte conductivity and viscosity.

Figure 5:
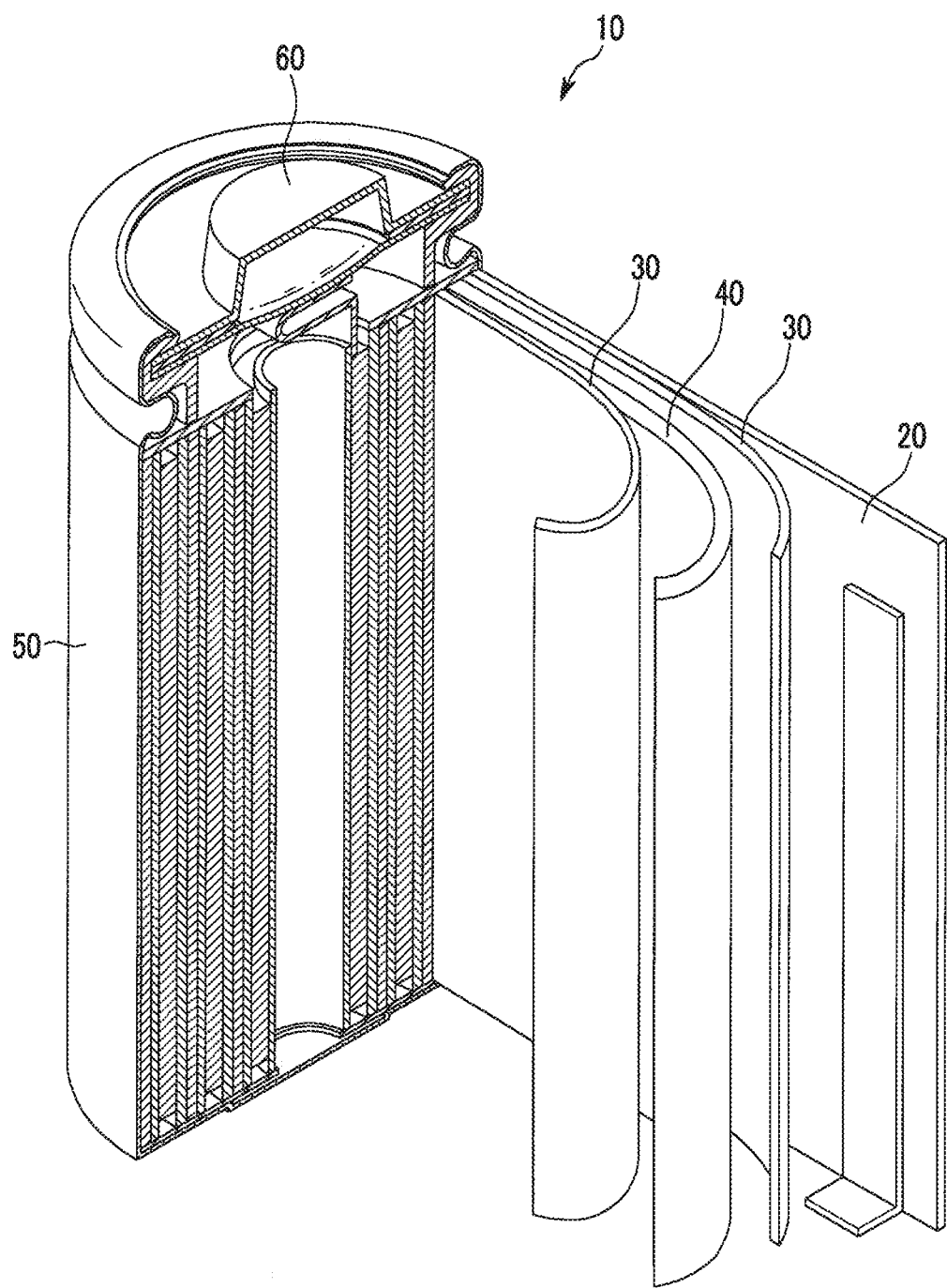
FIG. 5 shows a structure of a rechargeable lithium battery according to one embodiment.

FIG. 5 is a schematic view of a representative structure of a rechargeable lithium battery according to one embodiment. As shown in FIG. 5, the rechargeable lithium battery 10 includes negative electrode 20, positive electrode 30, an electrolyte 40 disposed between the negative electrode 20 and the positive electrode 30, and further includes a cell case 50 and a sealing member 60 sealing the cell case 50. The rechargeable lithium battery may be fabricated in diverse shapes, such as a polygonal shape, a pouch type, and is not limited thereto.

The following examples are provided for illustrative purposes. These examples, however, should not in any sense be interpreted as limiting the scope of this disclosure.

Fabrication of Positive Electrode

Example 1

An acrylonitrile monomer, a distilled water, and a polyvinyl alcohol were mechanically mixed in a reactor at a speed of 500 rpm. The monomer was used in an amount of 10 wt % based on a weight of distilled water. Next, the reactor temperature was adjusted to be at 50° C., and an initiator was added into the mixture. A mixed initiator of potassium persulfate:sodium bisulfate at a weight ratio of 3:2 was used as the initiator, and was used in an amount of 5 wt % based on the monomer weight. The mixture was polymerized at 50° C. for 6 hours to prepare an emulsion polymerized polyacrylonitrile nanoparticle having an average particle diameter of about 150 nm.

A polyvinylidene fluoride nanoparticle having an average particle diameter of about 220 nm was prepared according to the same manner as in preparation of the polyacrylonitrile nanoparticle, except that a vinylidene fluoride monomer was used instead of acrylonitrile.

Figure 6:
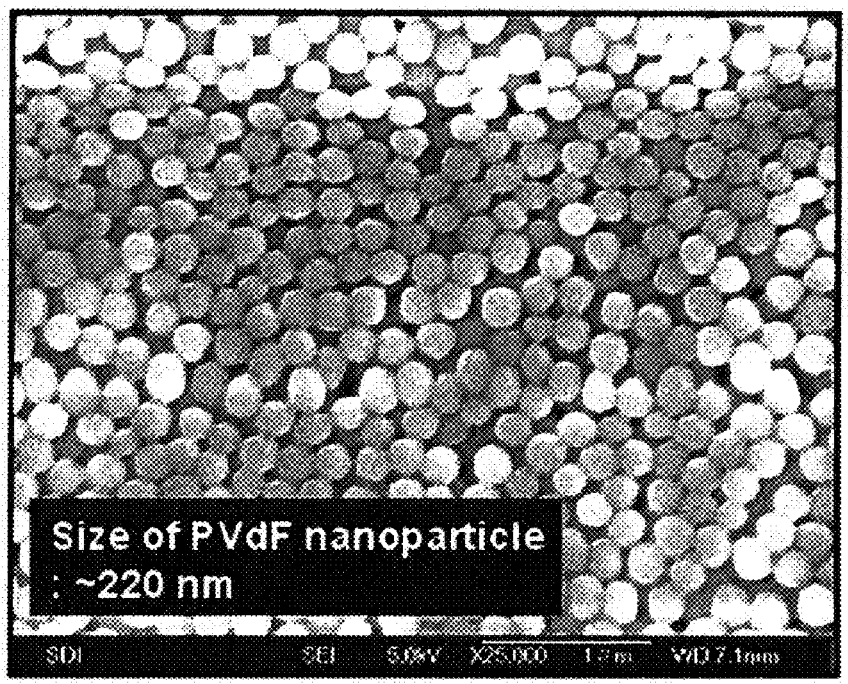
FIG. 6 is a SEM photograph of polyvinylidene fluoride a nanoparticle according to Example 1.

A positive active material composition was prepared by mixing $LiMn_2O_4$ as a positive active material, a mixture of polyacrylonitrile nanoparticles having an average particle diameter of about 150 nm and polyvinylidene fluoride nanoparticles (as shown in FIG. 6) having an average particle diameter of about 220 nm at a weight ratio of 10:90 as a binder, carboxylmethylcellulose as a thickener, and carbon black as a conductive agent each in amount of 85 wt %, 7 wt %, 1 wt %, and 7 wt %, respectively, and then dispersed in a mixed solvent of ethanol and water (70:30 weight ratio). The composition was coated on an aluminum foil having a thickness of 15 μm and dried at 100° C. for 1 hour. The dried electrode plate was pressed until 50% thickness of a pressed electrode compared to the thickness before pressing to provide a positive electrode having a suitable electrical conduction network.

Example 2

A positive electrode was fabricated according to the same method as in Example 1, except that the polyacrylonitrile nanoparticles and the polyvinylidene fluoride nanoparticles were used as a binder at a weight ratio of 30:70.

Example 3

A positive electrode was fabricated according to the same method as in Example 1, except that the polyacrylonitrile nanoparticles and the polyvinylidene fluoride nanoparticles were used as a binder at a weight ratio of 50:50.

Example 4

A positive electrode was fabricated according to the same method as in Example 1, except that the polyacrylonitrile nanoparticles and the polyvinylidene fluoride nanoparticles were used as a binder at a weight ratio of 80:20.

Comparative Example 1

A positive electrode was fabricated according to the same method as in Example 1, except that only the polyacrylonitrile nanoparticles were used as a binder.

Comparative Example 2

A positive electrode was fabricated according to the same method as in Example 1, except that only the polyvinylidene fluoride nanoparticles were used as a binder.

Comparative Example 3

A positive active material composition was prepared by mixing $LiMn_2O_4$ as a positive active material, a linear polyvinylidene fluoride binder, and carbon black as a conductive material in each amount of 85 wt %, 8 wt %, and 7 wt %, respectively, and dispersed in N-methyl-2-pyrrolidone. A positive electrode was fabricated according to the same method as in Example 1, except for using the positive active material composition.

Fabrication of Rechargeable Lithium Battery Cells

Battery cells including the positive electrode prepared according to Examples 1 to 4 and Comparative Examples 1-3 were fabricated to evaluate electrochemical characteristics of the rechargeable lithium battery.

A negative active material slurry was fabricated by mixing 97.5 wt % of a natural graphite negative active material, 1.5 wt % of a styrene-butadiene rubber binder, and 1 wt % of carboxylmethylcellulose as a thickener in a water solvent. The slurry was coated on a copper foil current collector, dried, and pressed to provide a negative electrode.

Full cells (2032 cells) were fabricated by using the positive electrodes obtained from Examples 1 to 4 and Comparative Examples 1 to 3 and the above negative electrode, respectively.

1.0M $LiPF_6$ dissolved in a mixed solution of ethylenecarbonate (EC) and dimethylcarbonate (DMC) at a volume ratio of 3:7 was used as an electrolyte solution.

Characteristic Evaluation of Full Cell

Experimental Example 1

60° C. Storage Characteristic Evaluation

The fabricated coin-type full cells were charged to 4.2V at 0.1 C under constant current (CC)/constant voltage (CV) condition and stored at 60° C. for 20 days.

The capacity retention (capacity after storing 20 days/initial capacity) of charged full cells after storage for 20 days at 60° C. was measured using a charge and discharge apparatus, and the results are shown in the following Table 1.

TABLE 1

|  | Capacity retention (%) after storage for 20 days at 60° C. |
| --- | --- |
| Example 1 | 69 |
| Example 2 | 77 |
| Example 3 | 83 |
| Example 4 | 80 |
| Comparative Example 1 | 62 |
| Comparative Example 2 | 54 |
| Comparative Example 3 | 58 |

As shown in the Table 1, the full cell capacity retentions of Examples 1 to 4 using polyacrylonitrile nanoparticles and polyvinylidene fluoride nanoparticles as a binder were superior to those of Comparative Examples 1 to 3. Particularly, Example 3 using a binder including 50 wt % of polyacrylonitrile nanoparticles, and 50 wt % of polyvinylidene fluoride nanoparticles, had a discharge capacity retention of 83%, the highest discharge capacity retention after storage for 20 days at 60° C. The polyacrylonitrile nanoparticles used as the binder traps manganese ions eluted form the manganese oxide positive active material, and therefore prevents them from moving to the negative electrode. Thereby, intercalation and deintercalation of lithium ions charged in the negative electrode may be prevented.

In Comparative Example 1 without polyvinylidene fluoride nanoparticles capable of performing dot-adhesion between positive active materials, a cell resistance was increased by separation of the positive active material layer from the aluminum current collector during storage at 60° C., and therefore, retention capacity of the cell was decreased. Accordingly, the manganese ions' trapping effect by the polyacrylonitrile nanoparticles was insufficient, which caused the low capacity retention.

In Comparative Example 2 using polyvinylidene fluoride nanoparticles instead of the polyacrylonitrile nanoparticles, mechanical properties of the positive electrode were weaker than that Comparative Example 3, which caused swelling on the positive electrode during storage at 60° C. Accordingly cell retention capacity of Comparative Example 2 was even lower than that of Comparative Example 3.

In Comparative Example 3 using linear polyvinylidene fluoride, the high temperature capacity retention was low.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A binder for a rechargeable lithium battery, the binder comprising a homogeneous mixture of:
    a nitrile-based polymer nanoparticle having an average particle size ranging from about 100 nm to about 200 nm; and
    a fluorine-containing polymer nanoparticle having an average particle size ranging from about 5 nm to about 300 nm, wherein the nitrile-based polymer nanoparticle and the fluorine-containing polymer nanoparticle are mixed at a weight ratio of about 30:70 to about 80:20.

2. The binder of claim 1, wherein the fluorine-containing polymer nanoparticle has an average particle size ranging from about 100 nm to about 200 nm.

3. The binder of claim 1, wherein an average particle size of the fluorine-containing polymer nanoparticle is between one to about two times an average particle size of the nitrile-based polymer nanoparticle.

4. The binder of claim 1, wherein the nitrile-based polymer nanoparticle comprises poly(acrylonitrile-co-methylmethacrylate), poly(acrylonitrile-co-methacrylic acid), poly(acrylonitrile-co-methylacrylonitrile), poly(acrylonitrile-co-lithium methacrylic acid) (MALi), or a combination thereof.

5. The binder of claim 1, wherein the fluorine-containing polymer nanoparticle comprises a polyvinylidene fluoride, polyvinylidene fluoride-hexafluoropropylene copolymer (PVdF-HFP), a polyvinylidenefluoride-tetrafluoroethylene copolymer (PVdF-TFE), or a combination thereof.

6. The binder of claim 1, wherein the binder comprises a cellulose-based thickener.

7. The binder of claim 6, wherein the cellulose-based thickener is included in an amount of about 10 parts by weight to about 30 parts by weight based on 100 parts by weight of the binder.

8. The binder of claim 6, wherein the cellulose-based thickener comprises carboxylmethyl cellulose, methyl cellulose, ethyl cellulose, hydroxy propyl methyl cellulose, hydroxy propyl ethyl cellulose, or a combination thereof.

9. A positive active material composition for a rechargeable lithium battery, the positive active material composition comprising
    a binder, the binder comprising a homogeneous mixture of a nitrile-based polymer nanoparticle having an average particle size ranging from about 100 mn to about 200 nm and a fluorine-containing polymer nanoparticle having an average particle size ranging from about 5 nm to about 300 nm, wherein the nitrile-based polymer nanoparticle and the fluorine-containing polymer nanoparticle are mixed at a weight ratio of about 30:70 to about 80:20;
    a positive active material;
    a conductive material; and
    a solvent.

10. The positive active material composition of claim 9, wherein the solvent comprises water.

11. The positive active material composition of claim 9, wherein the solvent comprises a mixed solvent of water and an organic solvent.

12. The positive active material composition of claim 9, wherein the positive active material is selected from the group consisting of $Li_aMn_{1-b}X_bD_2$ (0.90≤a≤1.8, 0≤b≤0.5); $Li_aMn_{1-b}X_bO_{2-c}D_c$ (0.90≤a≤1.8, 0≤b≤0.5, 0≤c≤0.05); $LiMn_{2-b}X_bO_4$ (0≤b≤0.5); $LiMn_{2-b}X_bO_{4-c}D_c$ (0≤b≤0.5, 0≤c≤0.05); $Li_aMn_{1-b-c}E_bX_cD_\alpha$ (0.90≤a≤1.8, 0≤b≤0.5, 0≤c≤0.05, 0<α≤2); $Li_aMn_{1-b-c}E_bX_cO_{2-\alpha}T_\alpha$ (0.90≤a≤1.8, 0≤b≤0.5, 0≤c≤0.05, 0<α<2); $Li_aMn_bE_cG_dO_2$ (0.90≤a≤1.8, 0≤b≤0.9, 0≤c≤0.5, 0.001≤d≤0.1); $Li_aMn_bCo_cNi_dG_eO_2$ (0.90≤a≤1.8, 0≤b≤0.9, 0≤c≤0.5, 0≤d≤0.5, 0.001≤e≤0.1); $LiaMnG_bO_2$ (0.90≤a≤1.8, 0.001≤b≤0.1) $Li_aMn_2G_bO_4$ (0.90≤a≤1.8, 0.001≤b≤0.1); $MnO_2$; $MnS_2$; $LiMnS_2$; $Li_{(3-f)}Mn_2(PO_4)_3$ (0≤f≤2), in which X is Al, Ni, Co, Mn, Cr, Fe, Mg, Sr, V, a rare earth element, or a combination thereof; D is O, F, S, P, or a combination thereof; E is Co, Ni, or a combination thereof; T is F, S, P, or a combination thereof; and G is Al, Cr, Mn, Fe, Mg, La, Ce, Sr, V, or a combination thereof.

13. A rechargeable lithium battery comprising:
a positive electrode including a positive active material, a conductive material and a binder, the binder comprising a homogeneous mixture of a nitrile-based polymer nanoparticle having an average particle size ranging from about 100 nm to about 200 nm and a fluorine-containing polymer nanoparticle having an average particle size ranging from about 5 nm to about 300 nm, wherein the nitrile-based polymer nanoparticle and the fluorine-containing polymer nanoparticle are mixed at a weight ratio of about 30:70 to about 80:20;
a negative electrode comprising a negative active material; and
a non-aqueous electrolyte.

14. The rechargeable lithium battery of claim 13, wherein the positive active material is selected from the group consisting of $Li_aMn_{1-b}X_bD_2$ (0.90≤a≤1.8, 0≤b≤0.5); $Li_aMn_{1-b}X_bO_{2-c}D_c$ (0.90≤a≤1.8, 0≤b≤0.5, 0≤c≤0.05); $LiMn_{2-b}X_bO_4$ (0≤b≤0.5); $LiMn_{2-b}X_bO_{4-c}D_c$ (0≤b≤0.5, 0≤c≤0.05); $Li_aMn_{1-b-c}E_bX_cD_\alpha$ (0.90≤a≤1.8, 0≤b≤0.5, 0≤c≤0.05, 0<α≤2); $Li_aMn_{1-b-c}E_bX_cO_{2-\alpha}T_\alpha$ (0.90≤a≤1.8, 0≤b≤0.5, 0≤c≤0.05, 0<α<2); $Li_aMn_bE_cG_dO_2$ (0.90≤a≤1.8, 0≤b≤0.9, 0≤c≤0.5, 0.001≤d≤0.1); $Li_aMn_bCo_cNi_dG_eO_2$ (0.90≤a≤1.8, 0≤b≤0.9, 0≤c≤0.5, 0≤d≤0.5, 0.001≤e≤0.1); $LiaMnG_bO_2$ (0.90≤a≤1.8, 0.001≤b≤0.1); $Li_aMn_2G_bO_4$ (0.90≤a≤1.8, 0.001≤b≤0.1); $MnO_2$; $MnS_2$; $LiMnS_2$; $Li_{(3-f)}Mn_2(PO_4)_3$ (0≤f≤2), in which X is Al, Ni, Co, Mn, Cr, Fe, Mg, Sr, V, a rare earth element, or a combination thereof; D is O, F, S, P, or a combination thereof; E is Co, Ni, or a combination thereof; T is F, S, P, or a combination thereof; and G is Al, Cr, Mn, Fe, Mg, La, Ce, Sr, V, or a combination thereof.

* * * * *